(12) United States Patent
Yamamoto

(10) Patent No.: US 7,744,260 B2
(45) Date of Patent: Jun. 29, 2010

(54) STRADDLE TYPE VEHICLE HAVING REAR COVER AND LIGHT ASSEMBLY AND METHOD FOR ASSEMBLING A LIGHT UNIT

(75) Inventor: Yoshiaki Yamamoto, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 414 days.

(21) Appl. No.: 11/280,947

(22) Filed: Nov. 16, 2005

(65) Prior Publication Data
US 2007/0216524 A1 Sep. 20, 2007

(30) Foreign Application Priority Data
Nov. 16, 2004 (JP) .............................. 2004-332230

(51) Int. Cl.
*B62J 6/04* (2006.01)

(52) U.S. Cl. ....................... 362/473; 362/540; 362/541; 362/545; 362/546; 362/499; 340/475; 340/479; 224/413; 296/37.1

(58) Field of Classification Search ................. 362/473, 362/540, 541, 545, 546, 499; 340/475, 479; 224/413; 296/37.1
See application file for complete search history.

(56) References Cited

U.S. PATENT DOCUMENTS

| | | | |
|---|---|---|---|
| 2,504,265 A | 4/1950 | Jozif | |
| 2,754,452 A | 7/1956 | Onksen | |
| 2,792,899 A | 5/1957 | Piatti | |
| 3,788,532 A * | 1/1974 | Bish | ............................ 224/413 |
| 5,955,945 A | 9/1999 | Fuhrer | |
| 6,031,452 A * | 2/2000 | Trbovich | .................... 340/475 |
| 6,332,639 B1 * | 12/2001 | Tanaka et al. | ............... 296/37.1 |
| 6,428,076 B2 * | 8/2002 | Sumada et al. | .............. 296/37.1 |
| 6,538,567 B2 * | 3/2003 | Stewart | ....................... 340/475 |
| 6,615,945 B2 | 9/2003 | Minami et al. | |
| 6,626,260 B2 | 9/2003 | Gagnon et al. | |
| 6,732,830 B2 | 5/2004 | Gagnon et al. | |
| 6,776,250 B2 | 8/2004 | Kuji et al. | |
| 6,892,842 B2 | 5/2005 | Bouffard et al. | |
| 7,066,293 B2 | 6/2006 | Kakizoe | |
| 7,125,134 B1 | 10/2006 | Hedlund et al. | |
| 7,374,192 B2 | 5/2008 | Mimasa | |
| 7,431,114 B2 | 10/2008 | Ohira et al. | |
| 2001/0013708 A1 * | 8/2001 | Tanaka et al. | ............... 296/37.1 |
| 2001/0015190 A1 | 8/2001 | Kawamoto | |

(Continued)

FOREIGN PATENT DOCUMENTS

| | | |
|---|---|---|
| EP | 0 459 286 A1 | 12/1991 |
| GB | 2 141 392 A | 12/1984 |
| JP | 59143721 A | 8/1984 |
| JP | 61012448 A | 1/1986 |
| JP | 61-175189 | 8/1986 |

(Continued)

*Primary Examiner*—Ismael Negron
(74) *Attorney, Agent, or Firm*—Keating & Bennett, LLP (57) ABSTRACT

A straddle type vehicle includes a movable cover on a rear trunk space and a light assembly having a first light unit extending in a generally horizontal direction and a second light unit extending in a generally vertical direction. The assembly can also include two vertical light units, one positioned on the left side of the movable cover and the other positioned on the right side of the movable cover, and one horizontal light positioned below the movable cover. Connectors and fastening mechanisms can be utilized to connect the light units and movable cover of the assembly. In addition, the first light unit and the second light unit can both be a light-emitting diode (LED) light source.

27 Claims, 9 Drawing Sheets

U.S. PATENT DOCUMENTS

| | | | |
|---|---|---|---|
| 2002/0044052 A1* | 4/2002 | Stewart | 340/475 |
| 2004/0145898 A1 | 7/2004 | Ase et al. | |
| 2005/0064785 A1 | 3/2005 | Lee | |
| 2005/0117359 A1 | 6/2005 | Takahashi et al. | |
| 2006/0139939 A1 | 6/2006 | Ohira et al. | |
| 2006/0193143 A1 | 8/2006 | Ohira et al. | |

FOREIGN PATENT DOCUMENTS

| | | |
|---|---|---|
| JP | 02136383 A | 5/1990 |
| JP | 06-263072 | 9/1994 |
| JP | 09150765 A | 6/1997 |
| JP | 2002-234477 | 8/2002 |

* cited by examiner

STRADDLE TYPE VEHICLE HAVING REAR COVER AND LIGHT ASSEMBLY AND METHOD FOR ASSEMBLING A LIGHT UNIT

CROSS-REFERENCE TO RELATED APPLICATIONS

This application is based on and claims priority under 35 U.S.C. §119(a)-(d) to Japanese Patent Application No. 2004-332230, filed Nov. 16, 2004, the entire content of which is hereby incorporated by reference.

BACKGROUND OF THE INVENTION

1. Field of the Invention

The present invention relates to straddle type-vehicles in general and, in particular, to a straddle type vehicle having a rear light assembly for providing sufficient light on an aft end of the vehicle at least during operating conditions.

2. Description of the Related Art

Some straddle type vehicles (e.g., motor scooters) are typically driven on highways, streets and roads during both the daytime and nighttime. As a result, straddle type vehicles typically have an exterior lighting system including a taillight and a pair of rear turning lights attached to the body frame of the vehicle. In addition, riders often desire to store cargo and other belongings in the vehicle during its operation. Storage space is limited in a straddle type vehicle and it is well known for such vehicles to have a trunk space, which often is located in the rear of the vehicle and is capable of storing cargo and other belongings of the rider. However, due to the compact nature of a straddle type vehicle and the desire to have the trunk as large as possible, the trunk's cover often comprises a significant portion of the rear surface of the vehicle.

Prior straddle type vehicles have placed the taillight and rear turning lights directly on the cover of the trunk since this was the most feasible location for such lights. While this approach allows a rider to store belongings in the open space contained in the trunk, the taillight and rear turning lights are often made smaller.

Consequently, there exists a need for a rear light assembly that provides larger rear lights, including a taillight and pair of turning lights, to enhance visibility of the vehicle and of its turn and braking indicators while still providing for ample trunk space.

SUMMARY OF THE INVENTION

In accordance with an aspect of the present invention, a straddle type vehicle has at least one wheel that is rotatable about a generally horizontal axis and includes a vehicle body having a trunk space. A movable cover is capable of enclosing at least a portion of the trunk space. A first light unit, which has a first lens, extends in a direction generally parallel to the horizontal axis, and a second light unit, which has a second lens, extends in a direction generally normal to the horizontal axis. Each of the first light unit and the second light unit are disposed next to a respective side of the movable cover.

In a preferred mode, the first light unit comprises a horizontal light unit having a horizontal lens and the second light unit comprises a vertical light unit having a vertical lens. In another preferred mode, a third light unit is provided which has a similar shape as the second light unit and is disposed such that its longitudinal axis lies generally parallel to the second light unit. In another preferred mode, the first light unit is located below the movable cover, the second light unit is located on the left side of the movable cover, and the third light unit is located on right side of the movable cover. In another preferred mode, a rear light assembly comprises the movable cover, vertical lights on both the left side and the right side of the movable cover, and a horizontal light on the bottom side of the movable cover.

In another preferred mode, the horizontal length of the movable cover is less than the horizontal length of the vehicle body. In addition, the horizontal length of the first light unit is greater than the horizontal length of the movable cover. As a result, the first light unit is sufficiently large relative to the movable cover. In another preferred mode, the straddle type vehicle also includes a trunk bracket for supporting the trunk space. In this preferred mode, the first light unit covers the trunk bracket in a direction generally parallel to the horizontal axis.

In another preferred mode, the trunk space is positioned at a rear end of the straddle type vehicle and can store cargo or other belongings of the rider. In addition, the first light unit comprises a horizontal first light unit and the second light unit comprises a pair of vertical flasher lights. In another preferred embodiment, the trunk space slants downward from an upper portion of the trunk space towards the rear end of the vehicle.

In accordance with another aspect of the present invention, a straddle type vehicle is provided comprising a vehicle body having an opening in the vehicle body, and a movable cover capable of covering at least a portion of the opening. The vehicle also includes at least one wheel that rotates about a horizontal axis. A first light unit has a first lens that extends in a direction generally parallel to the horizontal axis, a second light unit has a second lens that extends in a direction generally normal to the horizontal axis, and a third light unit has a third lens that extends in a direction generally normal to the horizontal axis. The first light unit extends along the bottom side of the movable cover, the second light unit extends along the left side of the movable cover, and the third light unit extends along the right side of the movable cover. In addition, the straddle type vehicle contains a first connector for attaching the first light unit to the second light unit and a second connector for attaching the first light unit to the third light unit. A first receiving member and a first fastening member are capable of mating in order to couple the second light unit to the trunk space. A second receiving member and a second fastening member are also capable of mating in order to couple the third light unit to the trunk space.

In a preferred mode, the straddle type vehicle includes a first plug hole located on the first connecter and a first plug piece extending vertically downward from the bottom of the second light unit. In yet another preferred mode, the straddle type vehicle includes a second plug hole located on the second connecter and a second plug piece extending vertically downward from the bottom of the third light unit.

The light units of the straddle type vehicle are not limited to typical lens assemblies. In one preferred mode, the first light unit and the second light unit both comprise a light-emitting diode (LED) light source. In another preferred mode, a third light unit is provided which also comprises a light-emitting diode (LED) light source. In another preferred mode, a first LED is positioned below the movable cover, a second LED is positioned on the left side of the movable cover, and a third LED is positioned on the right side of the movable cover.

A preferred method of assembling a light unit is provided for a straddle type vehicle having at least one wheel rotatable about a generally horizontal axis and having a vehicle body with a trunk space. This method includes positioning a first light unit along at least one side of a movable cover capable of enclosing at least a portion of the trunk space, connecting the first light unit to at least one side of the trunk space, positioning a second light unit along at least one side of the movable cover, fastening a second light unit to the first light unit, and connecting the second light unit to at least one side of the trunk space. In a mode where the movable cover, the first light unit, and the second light unit form an assembly, the method can additionally include fixing the assembly to the vehicle body of the straddle type vehicle.

For purposes of summarizing the invention and the advantages achieved over the prior art, certain objects and advantages of the invention have been described above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

BRIEF DESCRIPTION OF THE DRAWINGS

These and other features, aspects, and advantages of the present invention will now be described in connection with preferred embodiments of the invention, in reference to the accompanying drawings. The illustrated embodiments, however, are merely examples and are not intended to limit the invention. The drawings include the following nine figures.

DETAILED DESCRIPTION OF THE PREFERRED EMBODIMENT

Description will be hereinafter made of the present straddle type vehicle in accordance with embodiments of the invention with reference to the drawings. Corresponding or similar components are denoted in the drawings by the same or similar reference numerals.

The rear light assembly is illustrated in the drawings and is described below in the context of an application with a straddle type vehicle. The rear light assembly, however, can be used with other types of vehicles having limited space available at the rear of the vehicle. Preferably, the rear light assembly can be used with vehicles which have a wheel, a steering column, a steering mechanism coupled to the top of the steering column, and a straddle type seat located substantially near the steering column. For example, such vehicles in which a rear light assembly can be employed can include, but are not limited to, a motorcycle, a scooter, and a multi-terrain vehicle.

Figure 1:
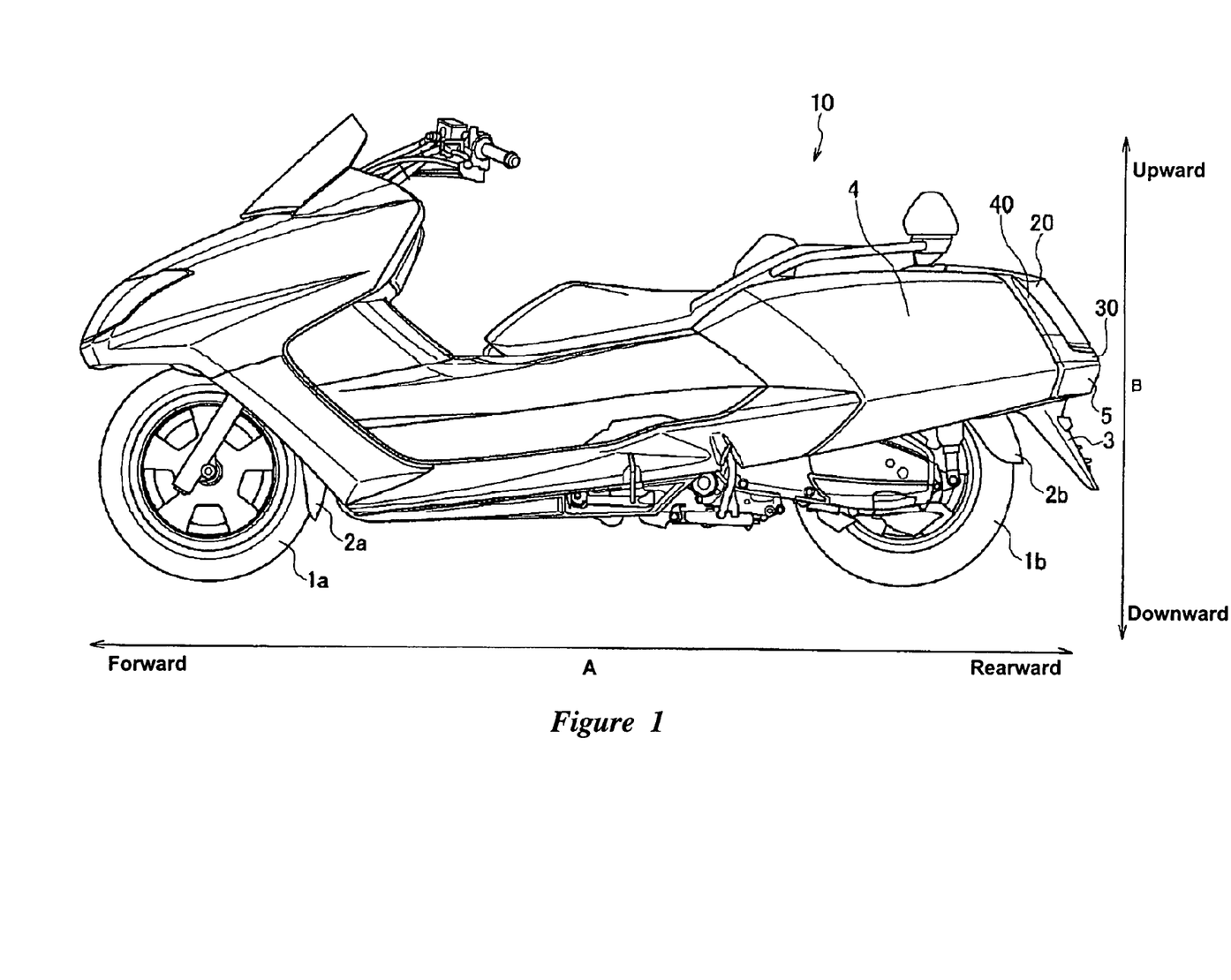
FIG. 1 is a side elevational view of a straddle type vehicle including a rear light assembly configured in accordance with a preferred embodiment of the present invention.

FIG. 1 is a side elevational view of a straddle type vehicle 10 in accordance with an embodiment of the invention, as seen from outside in the longitudinal direction of the straddle type vehicle 10. In this embodiment, the longitudinal direction of the straddle type vehicle 10 is a direction A as shown in FIG. 1, and the vertical direction of the straddle type vehicle 10 is a direction B as shown in FIG. 1.

As shown in FIG. 1, the straddle type vehicle 10 has wheels (front wheel 1a and rear wheel 1b) rotatably supported with an axle, fenders (fender 2a and fender 2b) for covering the peripheral area of the wheels from above, a fender cover 3 located rearward of the straddle type vehicle 10 from the rear wheel 1b, and a pair of side covers 4 for covering the body of the straddle type vehicle 10 from outside in the longitudinal direction thereof. In one embodiment, the wheels of the straddle type vehicle are rotatable about a generally horizontal axis.

The rear end portion of the straddle type vehicle 10 preferably comprises a trunk space 20 for holding at least an article, a first light unit 30 having a lens surface (first lens 31 as described later) extending in the transverse direction of the straddle type vehicle 10, a pair of flasher units 40 having a lens surface (flasher lens 41 as described later) extending in the vertical direction of the straddle type vehicle 10, and a rear cover 5 attached below the first light unit 30 for covering the body of the straddle type vehicle 10 from rearward thereof.

Preferably, the straddle type vehicle 10 in accordance with an embodiment of the invention is of a tandem type, on which at least one rider can ride. In one embodiment, the straddle type vehicle 10 has a seating mechanism such that the vehicle is capable of supporting two riders during operation.

Figure 2:
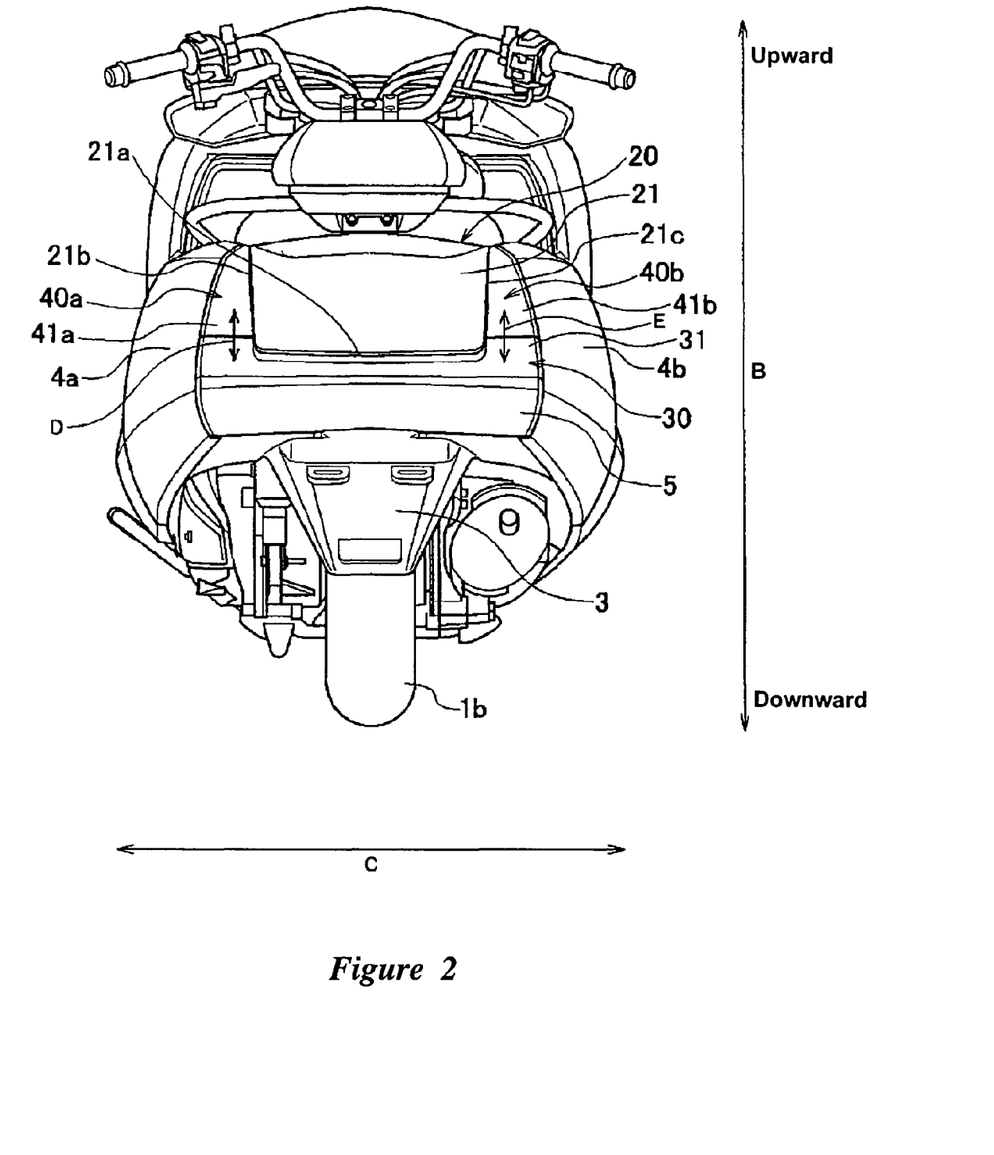
FIG. 2 is a rear elevational view of the straddle type vehicle as shown in FIG. 1.

FIG. 2 is a view of the straddle type vehicle 10, as seen from rearward of the straddle type vehicle 10. In this view, the transverse direction of the straddle type vehicle 10 is a direction C shown in FIG. 2.

As shown in FIG. 2, the trunk space 20, first light unit 30, and the paired flasher units 40 (second light unit 40a and third light unit 40b) described above are located at a rear part of the straddle type vehicle 10. The paired side covers 4 (body cover 4a and body cover 4b) described above cover the body of the straddle type vehicle 10 from outside in the transverse direction thereof.

The trunk space 20 has a box surface which is disposed at least partially on a rear surface of the straddle type vehicle 10 and which is directed outside of the straddle type vehicle 10. In one embodiment, the box surface is defined in part by a movable cover 21 when in a closed position.

The movable cover 21 can be attached to the vehicle body by a variety of mechanisms. For example, in one embodiment, the movable cover 21 is hinged to the vehicle body such that the movable cover 21 is capable of opening in a generally upward vertical direction and closing in a generally downward vertical direction relative to the straddle type vehicle 10. In such embodiment, the movable cover 21 is hinged at a top portion of the trunk space 20. In other embodiments, the movable cover 21 can be hinged at other locations relative to the trunk space including, but not limited to, the bottom of the trunk space 20, the left side of the trunk space 20, and the right side of the trunk space 20. The cover 21 can also be removable attached to the vehicle body rather than being hinged or otherwise tethered thereto.

In some applications, the space accessible beneath the cover 21 does not need to be an enclosed space (e.g., the truck space 20) capable of storing at least one article. By way of example, the space may comprise a location where components of the power train of the straddle type vehicle 10 are disposed. In addition, the trunk space 20 does not have to be located at the very rear of the vehicle. The trunk space 20 can, for example, be disposed farther forward on the vehicle body in comparison to the truck space 20 in the illustrated embodiment. As a result, the trunk space 20 can have a variety of configurations for a variety of purposes and can be located in many locations of the straddle type vehicle 10.

The first light unit 30 has a first lens 31 extending in the transverse direction of the straddle type vehicle 10. In one embodiment, the first lens 31 is positioned along the lower edge 21a of the box surface (movable cover 21 in the closed position). However, the first lens 31 can be positioned in other locations with respect to the box surface such as, but not limited to, above the trunk space 20 or at least partially over the trunk space 20.

The second light unit 40a has a second lens 41a extending in the vertical direction of the straddle type vehicle 10. The second lens 41a is positioned along the side edge 21b of the box surface (movable cover 21 in the closed position). The second lens 41a is positioned adjacent to one end (hereinafter referred to as "left end") of the first lens 31 in the transverse direction of the straddle type vehicle 10. The second light unit 40a is positioned such that the second lens 41a is aligned with the first lens 31 (left end) in a direction D.

Similarly, in one embodiment, the third light unit 40b has a third lens 41b extending in the vertical direction of the straddle type vehicle 10. The third lens 41b is positioned along the side edge 21c of the box surface (movable cover 21 in the closed position). The third lens 41b is positioned adjacent to the other end (hereinafter referred to as "right end") of the first lens 31 in the transverse direction of the straddle type vehicle 10. The third light unit 40b is positioned such that the third lens 41b is aligned with the first lens 31 (right end) in a direction E.

In one embodiment, the first lens 31 is positioned along the lower edge 21a of the box surface (movable cover 21 in the closed position), and the second lens 41a and the third lens 41b are positioned along the side edge 21b and the side edge 21c, respectively, of the box surface (movable cover 21 in the closed position). Advantageously, this allows increasing the area of the first lens 31, second lens 41a, and third lens 41b as seen from the rear end of the straddle type vehicle 10. In other words, visibility of the first lens 31, the second lens 41a, and third lens 41b when viewed from rearward of the straddle type vehicle 10 can be improved. As a result, other drivers are better able to see the rear lights of the vehicle when it is in operation.

In another embodiment, the light units are mounted over a portion of the trunk space 20 located at the rear part of the straddle type vehicle 10, being attached to either the vehicle body or the cover 21. Additionally, as noted above, the present light assembly can be employed at other locations on the vehicle. For example, the light units may be mounted about a space located at a front part of the straddle type vehicle 10. In particular, a headlight unit (transversely extending lamp unit) having a headlight lens (transversely extending lamp lens surface) extending in the transverse direction of the straddle type vehicle 10, and a pair of flasher units and/or a pair of fog lamp units (vertically extending lamp unit) may be mounted to a space located at the front part of the straddle type vehicle 10.

As shown in FIG. 2 and subsequent figures described below, the first light unit 30, the second light unit 40a, and the third light unit 40b are substantially continuous around a portion of the movable cover 20 and the trunk space 21. However, the configuration of the light units need not be continuous. In one embodiment, there may be a gap between, for example, the first light 30 and the second light unit 40a. In another embodiment, there may be a gap between the first light unit 30 and the third light unit 40b.

While the light units described above are configured around the movable cover 20, and not on the movable cover 20, the light units may also be substantially integrated with the movable cover 20. For example, in one embodiment, the first light unit 30 is integrated with at least a portion of the movable cover 20. In another embodiment, the second light unit 40a and the third light unit 40b are at least partially integrated with the movable cover 20. In yet another embodiment, all three light units are integrated with at least a portion of the movable cover 20.

The light units of the straddle type vehicle 10 are not limited to traditional vehicle light units. For example, in one embodiment, the light units comprise a light-emitting diode (LED) light source. Since an LED light source may provide certain advantages over traditional vehicle light sources in certain applications, the first light unit 30 can comprise an LED, the second light unit 40a can comprise an LED, and/or the third light unit 40b can comprise an LED.

Figure 3:
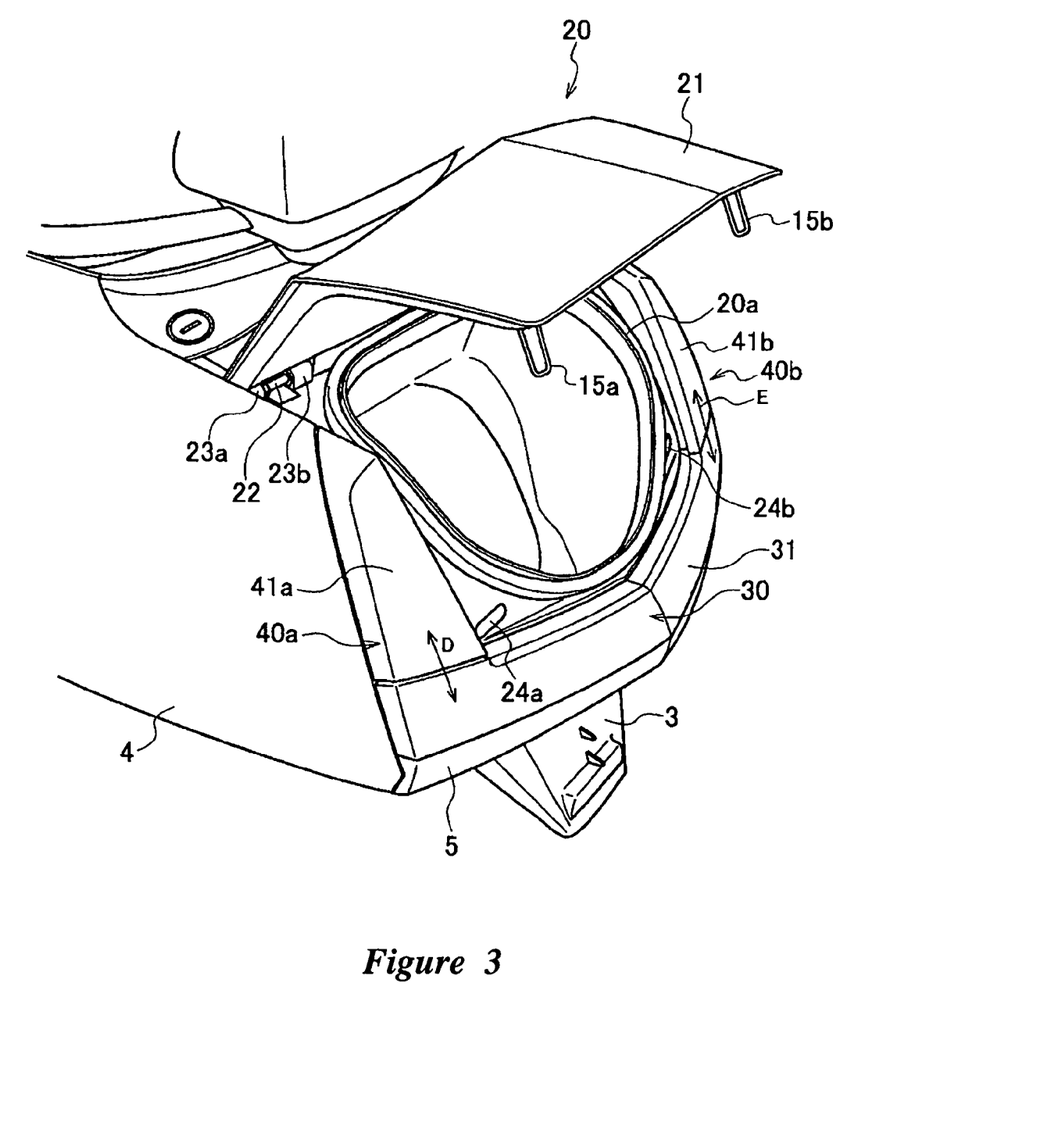
FIG. 3 is a rear perspective view of a trunk and the rear light assembly of the straddle type vehicle as shown in FIG. 1.

FIG. 3 is a perspective view of a rear portion of the straddle type vehicle 10 in accordance with an embodiment of the invention. As shown in FIG. 3, the trunk space 20 defines an opening 20a slanting downward rearward from an upper portion of the trunk space 20. In other words, the lower end of the opening 20a is positioned rearward from the upper end thereof. The trunk space 20 has a movable cover 21 for covering the opening 20a from above.

The trunk space 20 has a pair of support parts (support part 23a and support part 23b) for pivotally supporting the movable cover 21 about a rotation shaft 22, which extends in the transverse direction of the straddle type vehicle 10. The trunk space 20 also has a pair of retained slots (retained slot 24a and retained slot 24b) into which a pair of retaining parts (retaining part 15a and retaining part 15b) formed on the movable cover 21 are inserted respectively.

Advantageously, in this embodiment, the opening 20a of the trunk space 20 slants downward rearward from the upper portion of the trunk space 20. This makes it easier to put an article into and out of the trunk space 20. However, the opening 20a can slant in other directions and may provide certain advantages for such other configurations depending on the particular application.

Figure 4:
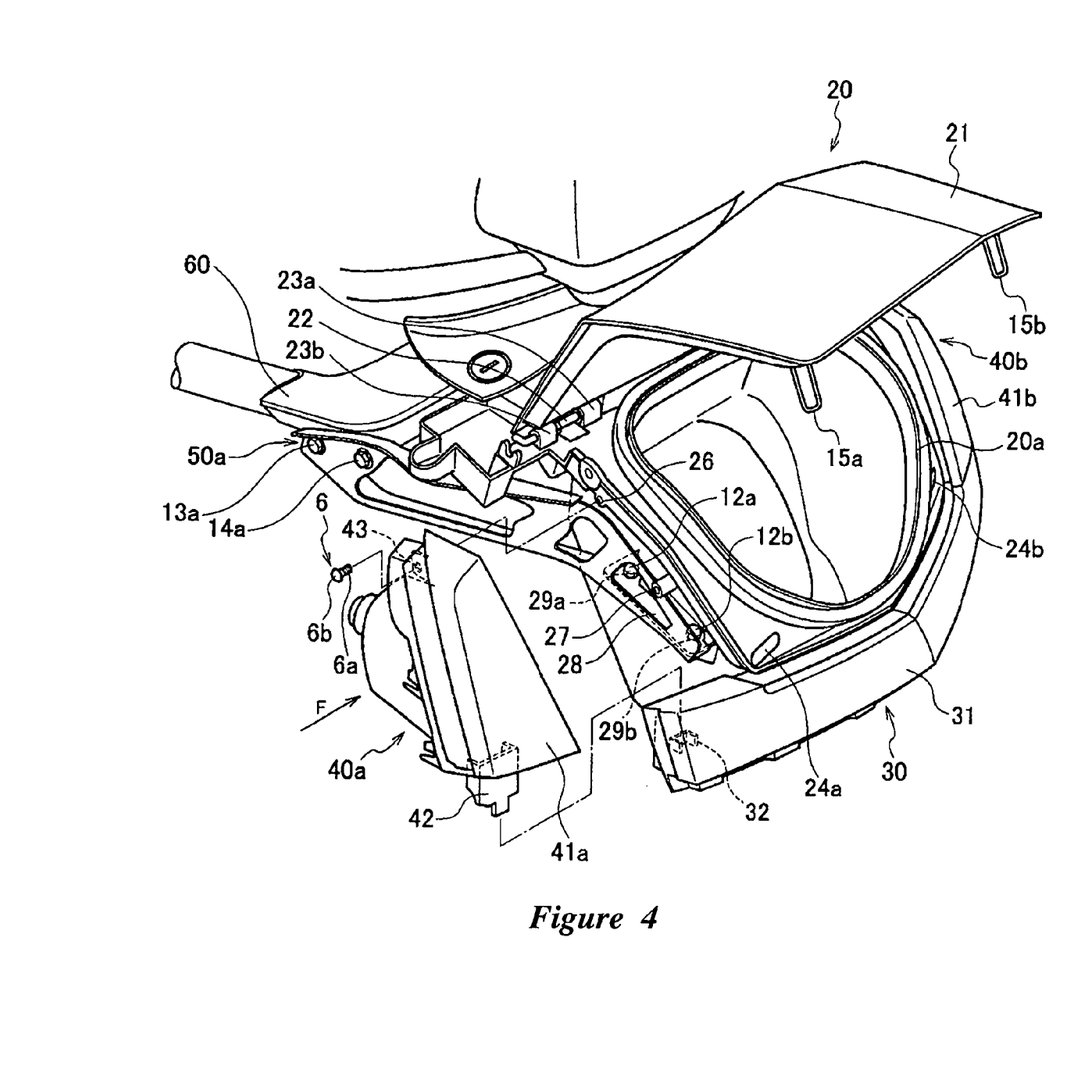
FIG. 4 is a partially exploded view of the trunk and the rear light assembly of the straddle type vehicle as shown in FIG. 3.

FIG. 4 is a partially exploded perspective view of the rear portion of the straddle type vehicle 10 in accordance with an embodiment of the invention. The fender cover 3, side cover 4, and rear cover 5 are not shown in FIG. 4. As shown in FIG. 4, the trunk space 20 has a screw hole 26, into which a screw 6 for securing the second light unit 40a to the trunk space 20 is fitted in the transverse direction of the vehicle. In addition, the trunk space 20 has a screw hole 27 for receiving a screw for securing the second light unit 40a to the trunk space 20 and a plate-like member 28 projecting outside in the transverse direction of the straddle type vehicle 10.

In one embodiment, the screw 6 includes a projecting portion 6a (portion in which a spiral groove is cut) and a head 6b. The screw hole 26 has approximately the same diameter as the projecting portion 6a of the screw 6. Fitting the screw 6 into the screw hole 26 allows the second light unit 40a to be substantially fixed to the trunk space 20.

In another embodiment, the plate-like member 28 has a screw hole 29a and a screw hole 29b into which a screw 12a and a screw 12b for securing a trunk bracket 50a to the trunk space 20 are fitted respectively. The trunk bracket 50a extends backward from a vehicle body frame 60 defining the frame structure of the straddle type vehicle 10.

The first light unit 30 has a plug hole 32, which is open upward, at one end (left end) thereof in the transverse direction of the vehicle. As described in more detail below, a plug piece 42 can be inserted into the plug hole 32. The second light unit 40a has the plug piece 42 projecting downward from a bottom part of the second light unit 40a, and a screw hole 43 into which the screw 6 described above is fitted.

The screw hole 43 has a diameter larger than that of the projecting portion of the screw 6. The screw 6 is fitted into both screw hole 43 and screw hole 26 while the second light unit 40a is adjusted to a position where the second light unit 40a is fixed to the trunk space 20.

The second light unit 40a is locked with the first light unit 30 as the plug piece 42 is inserted into the plug hole 32. At this time, the second lens 41a is positioned adjacent to the first lens 31 in the direction D (not shown in FIG. 4). In addition, the second light unit 40a is fixed to the trunk space 20 as the screw 6 is fitted into both screw hole 43 and screw hole 26 with the first lens 31 and the second lens 41a aligned with each other in the direction D (not shown in FIG. 4).

As described above, the diameter of the screw hole 43 is larger than that of the projecting portion 6a of the screw 6. This allows fitting the screw 6 into both screw hole 43 and screw hole 26 with the first lens 31 and the second lens 41a aligned with each other in the direction D (not shown in FIG. 4).

In one embodiment, the second light unit 40a is formed to cover the trunk bracket 50a from outside in the transverse direction of the vehicle as the second light unit 40a is fixed to the trunk space 20. In another embodiment, the third light unit 40b is locked with the first light unit 30 and then fixed to the trunk space 20 in the same way as the second light unit 40a. Thus, description of the structure of locking the third light unit 40b with the first light unit 30 (plug piece, plug hole, etc.) and the structure of fixing the third light unit 40b to the trunk space 20 (screw holes, etc.) is not repeated. The trunk bracket 50a is secured to the trunk space 20 with the screw 12a and the screw 12b and also to the vehicle body frame 60 with a screw 13a and a screw 14a.

In the foregoing embodiment, the second light unit 40a (and third light unit 40b) is fixed to the trunk space 20 with the screw 6 fitted. However, the present light assembly is not limited to this. The second light unit 40a may be fixed to the trunk space 20 with a tapping screw, a washer, a bolt and a nut, or a similar fixing mechanism.

Further, in the foregoing embodiment, the second light unit 40a (and third light unit 40b) is locked with the first light unit 30 by the plug piece 42 of the second light unit 40a being inserted into the plug hole 32 of the first light unit 30. However, the present light assembly is not limited to this. The second light unit 40a may be locked with the first light unit 30 by the plug piece of the first light unit 30 being inserted into the plug hole of the second light unit 40a.

Figure 5:
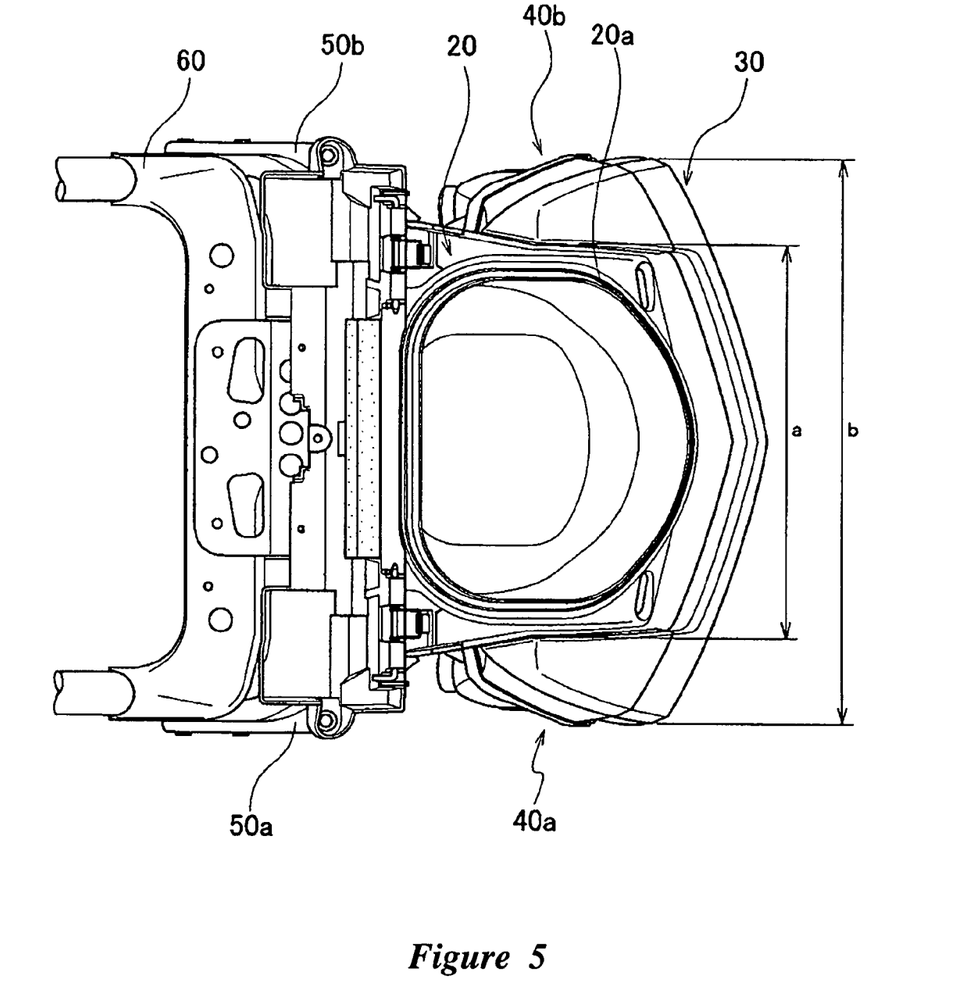
FIG. 5 is a top plan view of the trunk and the rear light assembly of the straddle type vehicle as shown in FIG. 3.
Figure 6:
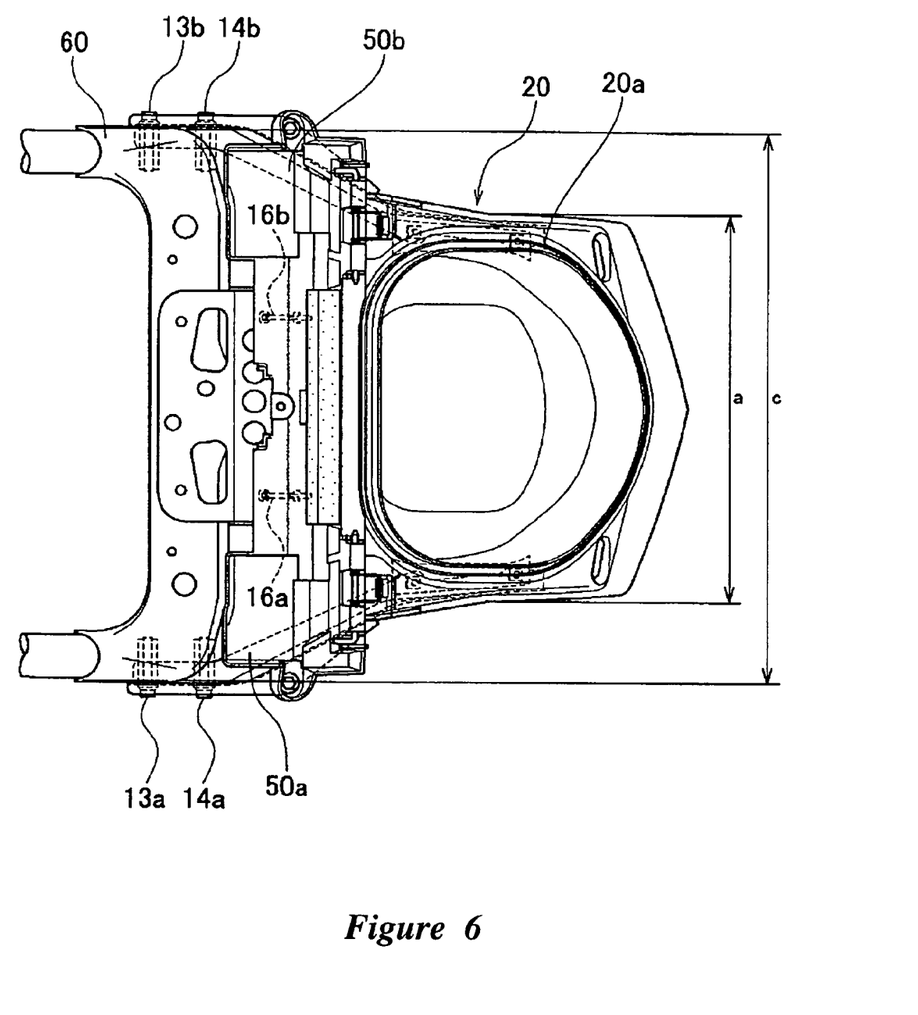
FIG. 6 is a top plan view of the trunk showing certain internal components of the straddle type vehicle as shown in FIG. 3.

FIGS. 5 and 6 are plan views of the trunk space 20, first light unit 30, second light unit 40a, and third light unit 40b in accordance with an embodiment of the invention. In order to show certain components of the vehicle, the movable cover 21 described above is not shown in FIGS. 5 and 6.

As shown in FIG. 5, a size (b) of the first light unit 30 in the transverse direction of the vehicle is larger than a size (a) of the truck space 20 in the transverse direction of the vehicle, outside of which the second light unit 40a and the third light unit 40b are located. The size (a) of the trunk space 20 in the transverse direction of the vehicle is smaller than a size (c) of the vehicle body frame 60 in the transverse direction of the vehicle, as shown in FIG. 6. More specifically, since the size (a) of the trunk space 20 in the transverse direction of the vehicle is smaller than the size (b) of the first light unit 30 in the transverse direction of the vehicle and the size (c) of the vehicle body frame 60 in the transverse direction of the vehicle, the area outside of the trunk space 20 in the transverse direction of the vehicle is used to locate the second light unit 40a and the third light unit 40b.

As shown in FIG. 6, a pair of trunk brackets (trunk bracket 50a and trunk bracket 50b) are attached to the vehicle body frame 60 and extend backward therefrom. Specifically, the trunk bracket 50a is secured to the vehicle body frame 60 with a screw 13a and a screw 14a. Similarly, the trunk bracket 50b is secured to the vehicle body frame 60 with a screw 13b and a screw 14b. In one embodiment, the trunk space 20 has a retaining part 16a and a retaining part 16b, with which the trunk space 20 is retained to the vehicle body frame 60. The trunk space 20 is supported with the trunk bracket 50a and the trunk bracket 50b from outside in the transverse direction of the vehicle.

Advantageously, since the size (a) of the trunk space 20 in the transverse direction of the vehicle is smaller than the size (b) of the first light unit 30 in the transverse direction of the vehicle and the size (c) of the vehicle body frame 60 in the transverse direction of the vehicle, the area outside of the trunk space 20 in the transverse direction of the vehicle can be used to locate the second light unit 40a and the third light unit 40b. In other words, the area outside of the trunk space 20 in the transverse direction of the vehicle can be effectively used.

The second light unit 40a and the third light unit 40b cover the trunk bracket 50a and the trunk bracket 50b respectively from outside in the transverse direction of the vehicle. This prevents the appearance of the straddle type vehicle 10 from being ruined due to an exposure of the trunk bracket 50a and the trunk bracket 50b.

Additionally, the trunk space 20, first light unit 30, second light unit 40a, third light unit 40b, trunk bracket 50a, and trunk bracket 50b are assembled together to form the box peripheral assembly, and the assembly is fixed to the vehicle body frame 60. This allows improving the efficiency of mounting work of the first light unit 30, second light unit 40a, and third light unit 40b.

Figure 7:
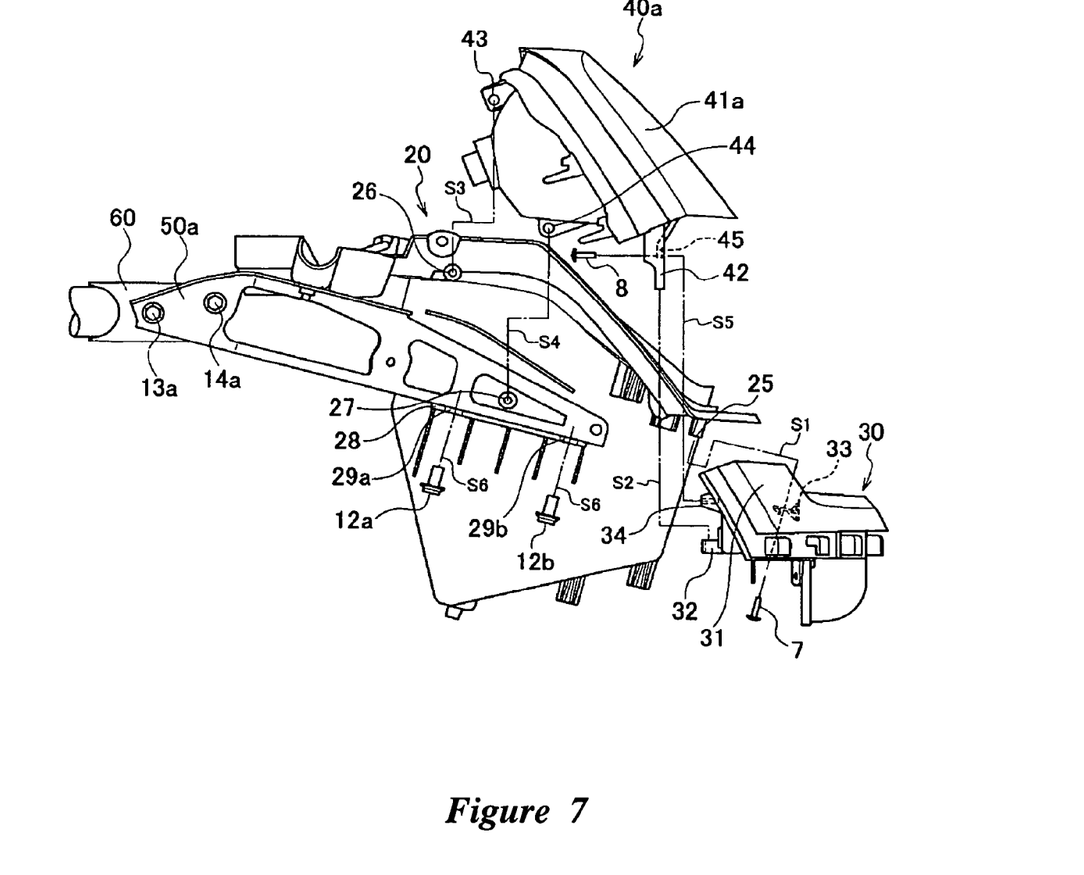
FIG. 7 is a partially exploded side elevational view of the trunk and the rear light assembly of the straddle type vehicle as shown in FIG. 3.

FIG. 7 shows the mounting structure and mounting method of the first light unit 30 and the second light unit 40a in accordance with an embodiment of the invention. FIG. 7 is a view of the rear portion of the straddle type vehicle 10, as seen in a direction F as shown in FIG. 4.

As shown in FIG. 7, in one embodiment, the trunk space 20 has a screw hole 25, into which a screw 7 is fitted, and the first light unit 30 has a screw hole 33, into which the screw 7 is fitted. The first light unit 30 is fixed to the trunk space 20 as the screw 7 is fitted into both screw hole 25 and screw hole 33. The first lens 31 is thereby positioned along the lower edge 21a of the box surface (movable cover 21 in the closed position) (step S1).

In one embodiment, the second light unit 40a is locked with the first light unit 30 as the plug piece 42 described above is inserted into the plug hole 32. The second lens 41a is thereby positioned along the side edge 21b of the box surface (movable cover 21 in the closed position). The second lens 41*a* is positioned adjacent to the left end of the first lens 31 (step S2).

Similarly, the third light unit 40*b* (not shown in FIG. 7) is locked with the first light unit 30 as the plug piece is inserted into the plug hole. The third lens 41*b* (not shown in FIG. 7) is thereby positioned along the side edge 21*c* of the box surface (movable cover 21 in the closed position). The third lens 41*b* is positioned adjacent to the right end of the first lens 31.

The second light unit 40*a* is fixed to the trunk space 20, as the screw 6 (not shown in FIG. 7) is fitted into both screw hole 43 and screw hole 26 with the second lens 41*a* aligned with the first lens 31 (step S3). Similarly, the third light unit 40*b* is fixed to the trunk space 20 with the third lens 41*b* aligned with the first lens 31.

The second light unit 40*a* is fixed to the trunk space 20 as a screw (not shown) is fitted into both screw hole 44 and screw hole 27 (step S4). The second light unit 40*a* is fixed to the first light unit 30 as a screw 8 is fitted into both screw hole 45 and screw hole 34 (step S5). In a similar manner, the third light unit 40*b* is fixed to the trunk space 20 and also to the first light unit 30.

The trunk bracket 50*a* is fixed to the trunk space 20 as the screw 12*a* and the screw 12*b* are fitted into the screw hole 29*a* and the screw hole 29*b*, respectively, of the plate-like member 28 described above (step S6). In a similar manner, the trunk bracket 50*b* is fixed to the trunk space 20. As a result, the first light unit 30, second light unit 40*a*, third light unit 40*b*, trunk bracket 50*a*, and trunk bracket 50*b* are fixed to the trunk space 20 to form a box peripheral assembly.

In one embodiment, the box peripheral assembly is retained to the vehicle body frame 60 with the retaining part 16*a* (not shown in FIG. 7) and the retaining part 16*b* (not shown in FIG. 7) of the trunk space 20. The box peripheral assembly is fixed to the vehicle body frame 60. In another embodiment, the trunk bracket 50*a* is fastened to the vehicle body frame 60 with the screw 13*a* and the screw 14*a* and the trunk bracket 50*b* is fastened to the vehicle body frame 60 with the screw 13*b* (not shown in FIG. 7) and the screw 14*b* (not shown in FIG. 7).

Advantageously, the second light unit 40*a* is locked with the first light unit 30 by the plug piece 42 of the second light unit 40*a* being inserted into the plug hole 32 of the first light unit 30 from above, and then the second light unit 40*a* locked with the first light unit 30 is fixed to the trunk space 20. This allows improving the efficiency of mounting work of the second light unit 40*a*. In a similar manner, the efficiency of mounting work of the third light unit 40*b* can be improved as well.

Advantageously, the second light unit 40*a* and the third light unit 40*b* are individually locked with the first light unit 30. Thus, even when the positions of both ends of the first lens 31 are displaced from each other in the longitudinal or vertical direction of the straddle type vehicle 10, the second lens 41*a* and the third lens 41*b* can be located adjacent to the corresponding ends of the first lens 31.

Additionally, the second light unit 40*a* and the third light unit 40*b* are individually fixed to the trunk space 20 with the second lens 41*a* and the third lens 41*b* aligned with the first lens 31. This allows mounting the first light unit 30, second light unit 40*a*, and third light unit 40*b* to the trunk space 20 such that the first lens 31, second lens 41*a*, and third lens 41*b* appear as a single surface, even when the positions of both ends of the first lens 31 are displaced from each other in the longitudinal or vertical direction of the straddle type vehicle 10.

In the foregoing embodiment, the second lens 41*a* and the third lens 41*b* are located above the first lens 31. However, the present light assembly is not limited to this configuration and the above components may be positioned in a variety of configurations. For example, the first lens 31 might be positioned above the second lens 41*a* and the third lens 41*b*. In another embodiment, the first lens 31 is positioned generally at the same level as the center of the second lens 41*a* and the center of the third lens 41*b* such that the first lens 31, the second lens 41*a*, and the third lens 41*b* comprise a H-like configuration. In addition, the first lens 31 may be configured at an angle with respect to the horizontal axis.

Figure 8A:
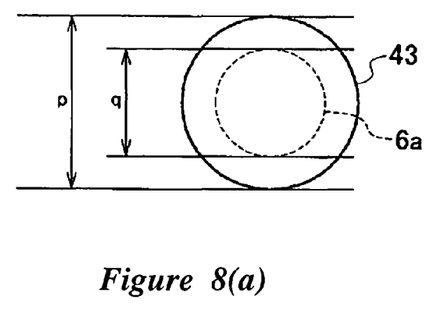
FIG. 8(a) is a front elevation view of a screw hole showing the relative dimensions of the screw hole with respect to a projecting portion of the straddle type vehicle as shown in FIG. 1.
Figure 8B:
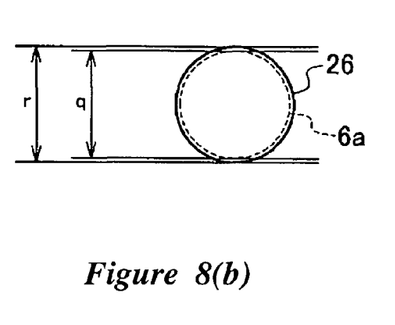
FIG. 8(b) is a front elevation view of another screw hole showing the relative dimensions of the screw hole with respect to a projecting portion of the straddle type vehicle as shown in FIG. 1.

FIGS. 8(*a*) and 8(*b*) show the screw hole 43 and the screw hole 26, respectively, in accordance with an embodiment of the invention. The screw hole 43 has a diameter p larger than a diameter q of the projecting portion 6*a*, as shown in FIG. 8(*a*). The screw hole 26 has a diameter r, which approximately equals the diameter q of the projecting portion 6*a*, as shown in FIG. 8(*b*).

In the foregoing embodiment, the screw hole 26 has approximately the same diameter as the projecting portion 6*a* of the screw 6, but the screw hole 26 also may have a diameter larger than that of the projecting portion 6*a* of the screw 6.

Figure 9:
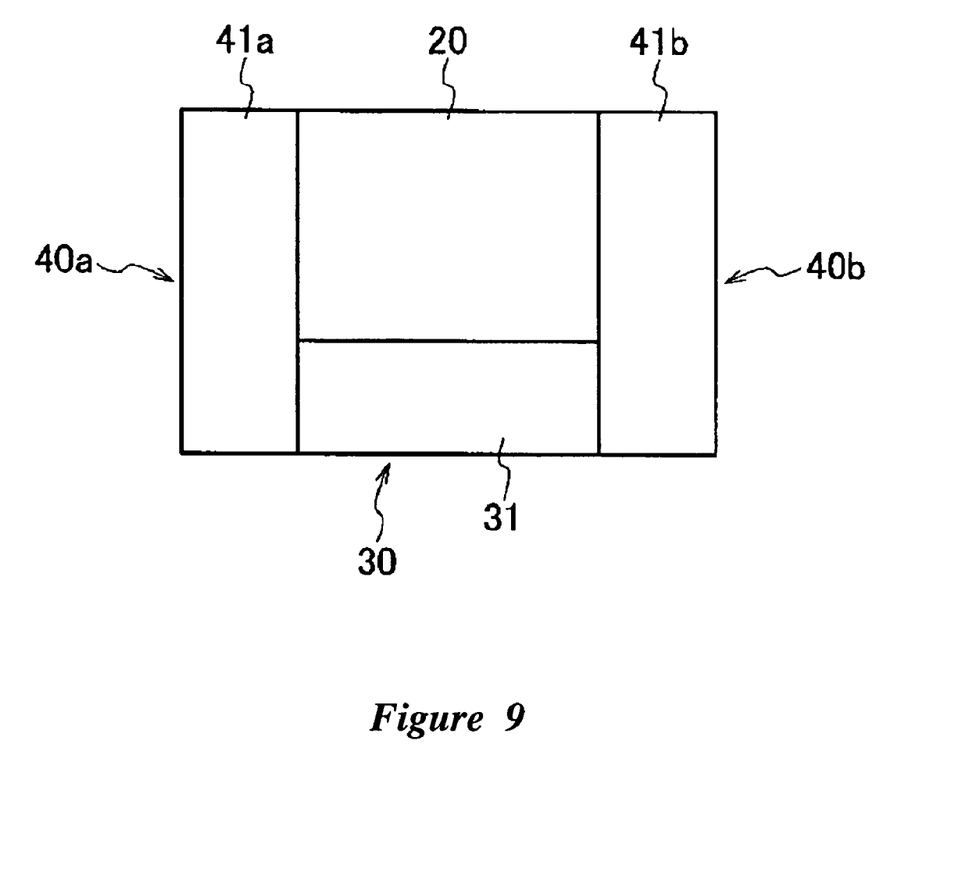
FIG. 9 shows a positional relationship among a first light unit, a second light unit, and a third light unit in accordance with a modification of the straddle type vehicle as shown in FIG. 1.

FIG. 9 shows the positional relationship among the first lens 31, second lens 41*a*, and third lens 41*b* in accordance with another embodiment of the rear light assembly. It should be noted that this embodiment is merely illustrative of another embodiment of the rear light assembly and does not limit the scope of the invention. Other light assemblies not specifically described are also possible.

As shown in FIG. 9, the second lens 41*a* and the third lens 41*b* may be located outside of the first lens 31 in the transverse direction of the straddle type vehicle 10 and along the sides of the trunk space 20 in the transverse direction of the straddle type vehicle 10. The method of mounting the first light unit 30, second light unit 40*a*, and third light unit 40*b* to the trunk space 20 is the same as in the foregoing embodiment described above with respect to FIGS. 1-8.

More specifically, the second light unit 40*a* and the third light unit 40*b* are individually locked with the first light unit 30 such that the second lens 41*a* and the third lens 41*b* are located adjacent to the first lens 31. Then, the second light unit 40*a* and the third light unit 40*b* are fixed to the trunk space 20 with the second lens 41*a* and the third lens 41*b* aligned with the first lens 31.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims.

What is claimed is:

1. A straddle type vehicle comprising:
 at least one wheel rotatable about a generally horizontal axis;
 a vehicle body having a trunk space, the wheel being coupled to the vehicle body;
 a movable cover capable of enclosing at least a portion of the trunk space;
 a first light unit having a first lens extending in a direction generally parallel to the horizontal axis, wherein the first lens extends along at least one side of the movable cover; and
 a second light unit having a second lens extending in a direction generally normal to the horizontal axis, wherein the second lens extends along at least one side of the movable cover; wherein
 the first and second light units are arranged to generally form an L-shape when viewed from a rear of the vehicle; and
 a bottom end of the second light unit is positioned higher than a bottom end of the movable cover when the movable cover is closed, the bottom end of the second light unit is positioned above a top end of the first light unit, and the bottom end of the second light unit adjoins the top end of the first light unit along an entire horizontal length of the bottom end of the second light unit.

2. The straddle type vehicle of claim 1, wherein the first light unit having a first lens comprises a horizontal light unit having a horizontal lens.

3. The straddle type vehicle of claim 1, wherein the second light unit having a second lens comprises a vertical light unit having a vertical lens.

4. The straddle type vehicle of claim 1, further comprising a trunk bracket attached to the vehicle body for supporting the trunk, wherein the first light unit covers at least a portion of the trunk bracket.

5. The straddle type vehicle of claim 1, wherein the first light unit comprises an elongated lens extending entirely below the movable cover.

6. The straddle type vehicle of claim 1, wherein the second light unit is disposed entirely to one side of the movable cover.

7. The straddle type vehicle of claim 1, wherein the first light unit and the second light unit extend around a corner of the movable cover.

8. The straddle type vehicle of claim 1, further comprising a third light unit having a third lens, wherein the third light unit has a similar shape to the second light unit and is disposed such that its longitudinal axis lies generally parallel to the second light unit.

9. The straddle type vehicle of claim 8, wherein the first lens is positioned below the movable cover, the second lens is positioned on the left side of the movable cover, and the third lens is positioned on the right side of the movable cover.

10. The straddle type vehicle of claim 1, wherein the width of the movable cover in a direction generally parallel to the horizontal axis is less than the width of the vehicle body in a direction generally parallel to the horizontal axis.

11. The straddle type vehicle of claim 10, wherein the width of the first light unit in a direction generally parallel to the horizontal axis is greater than the width of the movable cover in a direction generally parallel to the horizontal axis.

12. The straddle type vehicle of claim 1, wherein the trunk space is positioned at a rear end of the vehicle and is capable of storing an article therein, the first light unit is a taillight unit, and the second light unit is a flasher light unit.

13. The straddle type vehicle of claim 12, wherein an opening to the trunk space slants downward from an upper portion of the trunk space in a direction towards the rear end of the vehicle.

14. A straddle type vehicle comprising:
 at least one wheel rotatable about a generally horizontal axis;
 a vehicle body having a trunk space;
 a movable cover capable of enclosing at least a portion of the trunk space;
 a first light unit having a first lens extending in a direction generally parallel to the horizontal axis, wherein the first lens extends along a bottom end of the movable cover;
 a second light unit having a second lens extending in a direction generally normal to the horizontal axis, wherein the second lens extends along the left side of the movable cover;
 a third light unit having a third lens extending in a direction generally normal to the horizontal axis, wherein the third lens extends along the right side of the movable cover;
 a first connector arranged to attach the first light unit and the second light unit;
 a second connector arranged to attach the first light unit and the third light unit;
 a first receiving member located on the second light unit and the trunk space which receives a first fastening member in order to connect the second light unit to the trunk space; and
 a second receiving member located on the third light unit and the trunk space which receives a second fastening member in order to connect the third light unit to the trunk space; wherein
 the first and second light units are arranged to generally form an L-shape when viewed from a rear of the vehicle; and
 a bottom end of the second light unit and a bottom end of the third light unit are positioned higher than the bottom end of the movable cover when the movable cover is closed, the bottom end of the second light unit and the bottom end of third light unit are positioned above a top end of the first light unit, and the bottom end of the second light unit and the bottom end of the third light unit adjoin the top end of the first light unit along an entire horizontal length of the bottom end of the second light unit and the bottom end of the third light unit.

15. The straddle type vehicle of claim 14, wherein the third light unit extends in a direction generally normal to the horizontal axis from at least a portion of a first end of the first light unit.

16. The straddle type vehicle of claim 14, wherein the first light unit comprises a single unit and a first portion of the first light unit is coupled to the second light unit and a second portion of the first light unit is coupled to the third light unit.

17. The straddle type vehicle of claim 14, wherein the first light unit and the second light unit extend around a first corner of the movable cover and the first light and the third light unit extend around a second corner of the movable cover.

18. The straddle type vehicle of claim 14, wherein the first light unit is directly coupled to the second light unit at a first end of the first light unit and the first light unit is directly coupled to the third light unit at a second end of the first light unit.

19. The straddle type vehicle of claim 14, wherein the first and third light units are configured to generally form an L-shape.

20. The straddle type vehicle of claim 14, wherein the first light unit, the second light unit, and the third light unit are configured to generally form a U-shape.

21. The straddle type vehicle of claim 14, additionally comprising a first plug hole located on the first connector and a first plug piece extending vertically downward from a bottom portion of the second light unit.

22. The straddle type vehicle of claim 21, additionally comprising a second plug hole located on the second connector and a second plug piece extending vertically downward from a bottom portion of the third light unit.

23. A straddle type vehicle comprising:
   at least one wheel rotatable about a generally horizontal axis;
   a vehicle body having an opening;
   a movable cover capable of covering at least a portion of the opening;
   a first light unit extending in a direction generally parallel to the horizontal axis, wherein the first light unit extends along at least one side of the movable cover; and
   a second light unit extending in a direction generally normal to the horizontal axis, wherein the second light unit extends along at least one side of the movable cover; wherein
   the first and second light units are arranged to generally form an L-shape when viewed from a rear of the vehicle; and
   a bottom end of the second light unit is positioned higher than a bottom end of the movable cover when the movable cover is closed, the bottom end of the second light unit is positioned above a top end of the first light unit, and the bottom end of the second light unit adjoins the top end of the first light unit along an entire horizontal length of the bottom end of the second light unit.

24. The straddle type vehicle of claim 23, wherein the first light unit comprises a first light-emitting diode (LED) and the second light unit comprises a second light-emitting diode (LED).

25. The straddle type vehicle of claim 23, further comprising a third light unit having a similar shape to the second light unit and being disposed such that its longitudinal axis lies generally parallel to the second light unit.

26. The straddle type vehicle of claim 25, wherein the third light unit comprises a third light-emitting diode (LED).

27. The straddle type vehicle of claim 26, wherein the first light-emitting diode (LED) is positioned below the movable cover, the second light-emitting diode (LED) is positioned on the left side of the movable cover, and the third light-emitting diode (LED) is positioned on the right side of the movable cover.

* * * * *